US012334053B2

(12) United States Patent
Liu et al.

(10) Patent No.: US 12,334,053 B2
(45) Date of Patent: Jun. 17, 2025

(54) INTELLIGENT EXPANDING SIMILAR WORD MODEL SYSTEM AND METHOD THEREOF

(71) Applicant: CYBERON CORPORATION, New Taipei (TW)

(72) Inventors: Chin-Jung Liu, New Taipei (TW); Shih-Hsun Chen, New Taipei (TW); Chih-Lung Lin, New Taipei (TW)

(73) Assignee: CYBERON CORPORATION, New Taipei (TW)

(*) Notice: Subject to any disclaimer, the term of this patent is extended or adjusted under 35 U.S.C. 154(b) by 232 days.

(21) Appl. No.: 17/966,405

(22) Filed: Oct. 14, 2022

(65) Prior Publication Data

US 2023/0117438 A1 Apr. 20, 2023

(30) Foreign Application Priority Data

Oct. 15, 2021 (TW) .................................. 110138414
Sep. 26, 2022 (TW) .................................. 111136341

(51) Int. Cl.
 *G10L 15/06* (2013.01)
 *G10L 15/22* (2006.01)
 *G10L 15/30* (2013.01)

(52) U.S. Cl.
 CPC ............ *G10L 15/063* (2013.01); *G10L 15/22* (2013.01); *G10L 15/30* (2013.01); *G10L 2015/0636* (2013.01); *G10L 2015/223* (2013.01)

(58) Field of Classification Search
 CPC ....... G10L 15/063; G10L 15/22; G10L 15/30; G10L 2015/0636; G10L 2015/223; G10L 15/10
 USPC .......................................... 704/251
 See application file for complete search history.

(56) References Cited

U.S. PATENT DOCUMENTS 7,590,533 B2 * 9/2009 Hwang ................. G10L 15/063
 704/235
2021/0407498 A1 * 12/2021 Stoimenov ............ G10L 15/063

FOREIGN PATENT DOCUMENTS

JP           2016102866 A  *  6/2016
WO    WO-2016147292 A1  *  9/2016  ............. G10L 15/10
WO    WO-2019179285 A1  *  9/2019  ............. G10L 15/22

* cited by examiner

Primary Examiner — Md S Elahee
(74) Attorney, Agent, or Firm — MUNCY, GEISSLER, OLDS & LOWE, P.C.

(57) ABSTRACT

An intelligent expanding similar word model system and a method thereof are provided. The system is operated in a database system host and includes: a character analysis unit, configured to combine a plurality of key word acoustic models with an interference sound key word test set into a key word forward test module; a candidate word generation unit, configured to generate a plurality of candidate word temporary acoustic models; a recognition rate processing unit, configured to generate a first candidate word acoustic model; a false waking-up rate processing unit, configured to generate a second candidate word acoustic model; and an adjustment unit, configured to combine the plurality of key word acoustic models with the second candidate word acoustic model into a similar word acoustic model.

10 Claims, 5 Drawing Sheets

INTELLIGENT EXPANDING SIMILAR WORD MODEL SYSTEM AND METHOD THEREOF

CROSS-REFERENCE TO RELATED APPLICATION

This application claims the benefit of Taiwan Patent Application No. 110138414, filed on Oct. 15, 2021 and of Taiwan Patent Application No. 111136341, filed on Sep. 26, 2022, which are hereby incorporated by reference for all purposes as if fully set forth herein.

BACKGROUND

Technical Field

The present invention relates to an intelligent expanding similar word model system and a method thereof, and in particular, to an intelligent expanding similar word model system and a method thereof through which a similar word model similar to a key word can be automatically added when a required key word is expanded in the field of speech recognition.

Related Art

With the development and popularization of artificial intelligence, the demand of voice control applications such as speech recognition control is increasing day by day. In the speech recognition control, a key word needs to be used as a necessary means to wake up a system, a speech recognition system must learn to recognize various key words, and various similar words need to be added to train the system not to be mistakenly waken up by words and sentences similar to the key word.

In such a learning process, first, a large amount of data must be collected to facilitate subsequent semantic analysis and classification, and then speech recognition through audio conversion needs a matching process of semantic analysis to find the most relevant correspondence. In the process, a large amount of operations are needed, and similar words must be manually created in tradition, which is relatively difficult for a non-native language developer. In addition, whether to choose the similar word or not needs to be manually decided, which is quite time-consuming.

SUMMARY

The present invention provides an intelligent expanding similar word model system and a method thereof, aiming to automate a process of selecting a similar word, and to reduce manpower consumption. The system and the method thereof can be operated as long as audio data of a "key word" and audio data of a "misrecognition test" are prepared, and be easily used by a non-native language developer.

The present invention provides an intelligent expanding similar word model system. The system is operated in a database system host and includes: a character analysis unit, configured to generate a plurality of key word acoustic models according to a key word character, and to combine the plurality of key word acoustic models with an interference sound key word test set into a key word forward test module; a candidate word generation unit, connected to the character analysis unit in telecommunication, and configured to replace each syllable of the key word character one by one by using a syllable correspondence table according to the plurality of key word acoustic models to generate a plurality of candidate word temporary acoustic models; a recognition rate processing unit, connected to the candidate word generation unit in telecommunication, and configured to execute a speech recognition simulation program, and to obtain a key word recognition rate of a key word forward test module and a candidate word recognition rate of a candidate word forward test module, where when a recognition rate difference between the key word recognition rate and the candidate word recognition rate is greater than a recognition threshold, after a plurality of candidate word acoustic models which reduces a recognition rate in the candidate word acoustic model in the candidate word forward test module is deleted, a first candidate word acoustic model is generated; a false waking-up rate processing unit, connected to the recognition rate processing unit in telecommunication, and configured to execute a false waking-up rate simulation program, and to obtain a candidate word false waking-up rate of a first candidate word false waking-up test module and a key word false waking-up rate of a key word false waking-up test module, where when the candidate word false waking-up rate is less than the key word false waking-up rate, a plurality of candidate word acoustic models which reduces a false waking-up rate is selected, and a second candidate word acoustic model is generated; and an adjustment unit, connected to the character analysis unit, the candidate word generation unit, the recognition rate processing unit, and the false waking-up rate processing unit in telecommunication, and configured to combine the plurality of key word acoustic models with the plurality of candidate word temporary acoustic models into a plurality of candidate word acoustic models, combine the plurality of candidate word acoustic models with the interference sound key word test set into the candidate word forward test module, combine the first candidate word acoustic model with a false waking-up test set into the first candidate word false waking-up test module, combine the plurality of key word acoustic models with the false waking-up test set into the key word false waking-up test module, and combine the plurality of key word acoustic models with the second candidate word acoustic model into a similar word acoustic model, where the interference sound key word test set further includes interference sound key word audio data, the speech recognition simulation program being executed on the interference sound key word test set and the key word acoustic models in the key word forward test module to obtain the key word recognition rate, and the speech recognition simulation program being executed on the interference sound key word test set and the candidate word acoustic models in the candidate word forward test module to obtain the candidate word recognition rate.

In an embodiment of the present invention, the intelligent expanding similar word model system further includes a key word acoustic model processing unit, where the key word acoustic model processing unit is configured to combine a key word test set corresponding to the plurality of key word acoustic models with an interference sound to generate the interference sound key word test set.

In an embodiment of the present invention, the intelligent expanding similar word model system further includes a key word extraction unit, where the key word extraction unit is configured to obtain the key word test set.

In an embodiment of the present invention, the intelligent expanding similar word model system further includes a storage unit, where the storage unit is configured to store the key word acoustic model, the candidate word temporary acoustic model, the candidate word acoustic model, the first candidate word acoustic model, the second candidate word acoustic model, and the similar word acoustic model.

In an embodiment of the present invention, the character analysis unit generates the key word acoustic model through a monophone modeling mode or a triphone modeling mode.

In an embodiment of the present invention, the candidate word generation unit replaces each syllable of the key word character one by one by using a syllable correspondence table to generate a plurality of candidate word temporary acoustic models.

In an embodiment of the present invention, the recognition rate difference in the recognition rate processing unit is a natural number.

In an embodiment of the present invention, a number of the candidate word acoustic models in the candidate word forward test modules is greater than or equal to a number of the candidate word acoustic models in the number of the first candidate word acoustic models. The number of the candidate word acoustic models in the number of the first candidate word acoustic models is greater than or equal to a number of the candidate word acoustic models in a number of the second candidate word acoustic models. The number of the candidate word acoustic models in the number of the second candidate word acoustic models is greater than or equal to a number of the candidate word acoustic models in the similar word acoustic models.

In an embodiment of the present invention, the recognition threshold is a system preset value or a user set value.

The present invention further provides an intelligent expanding similar word model method, including: generating, by using a character analysis unit, a plurality of key word acoustic models according to a key word character, and combining the plurality of key word acoustic models with an interference sound key word test set into a key word forward test module; replacing, by using a candidate word generation unit, each syllable of the key word character one by one by using a syllable correspondence table according to the plurality of key word acoustic models to generate a plurality of candidate word temporary acoustic models; combining, by using an adjustment unit, the plurality of key word acoustic models with the plurality of candidate word temporary acoustic models into a plurality of candidate word acoustic models, and combining the plurality of candidate word acoustic models with the interference sound key word test set into a candidate word forward test module; executing, by using a recognition rate processing unit, a speech recognition simulation program, to obtain a key word recognition rate of the key word forward test module and a candidate word recognition rate of the candidate word forward test module, wherein when a recognition rate difference between the key word recognition rate and the candidate word recognition rate is greater than a recognition threshold, after a plurality of candidate word acoustic models which reduces a recognition rate in the candidate word acoustic model in the candidate word forward test module is deleted, a first candidate word acoustic model is generated; combining, by using the adjustment unit, the first candidate word acoustic model with a false waking-up test set into a first candidate word false waking-up test module; combining, by using the adjustment unit, the plurality of key word acoustic models with the false waking-up test set into a key word false waking-up test module; executing, by using a false waking-up rate processing unit, a false waking-up rate simulation program, to obtain a candidate word false waking-up rate of the first candidate word false waking-up test module and a key word false waking-up rate of the key word false waking-up test module, where when the candidate word false waking-up rate is less than the key word false waking-up rate, a plurality of candidate word acoustic models which reduces a false waking-up rate is selected, and a second candidate word acoustic model is generated; and combining, by the adjustment unit, the plurality of key word acoustic models with the second candidate word acoustic model into a similar word acoustic model, where the interference sound key word test set further includes interference sound key word audio data, the speech recognition simulation program being executed on the interference sound key word test set and the key word acoustic models in the key word forward test module to obtain the key word recognition rate, and the speech recognition simulation program being executed on the interference sound key word test set and the candidate word acoustic models in the candidate word forward test module to obtain the candidate word recognition rate.

Effects of the present invention are as follows. A large amount of similar word candidate words are automatically generated, a similar word affecting the recognition rate in the similar word candidate list is automatically deleted using key word test sentences, and a most effective similar word is gradually selected from the similar word candidate list through a test audio file of a false touch rate to establish a key word model required for speech recognition, thereby effectively improving a situation where the similar words must be manually created in tradition, which is relatively difficult for a non-native language developer, and resolving a problem that whether to choose the similar word or not needs to be manually decided, which is quite time-consuming.

DETAILED DESCRIPTION

To make the features and advantages of the present invention clear and easy to understand, the following gives a detailed description of embodiments with reference to accompanying drawings.

Figure 1:
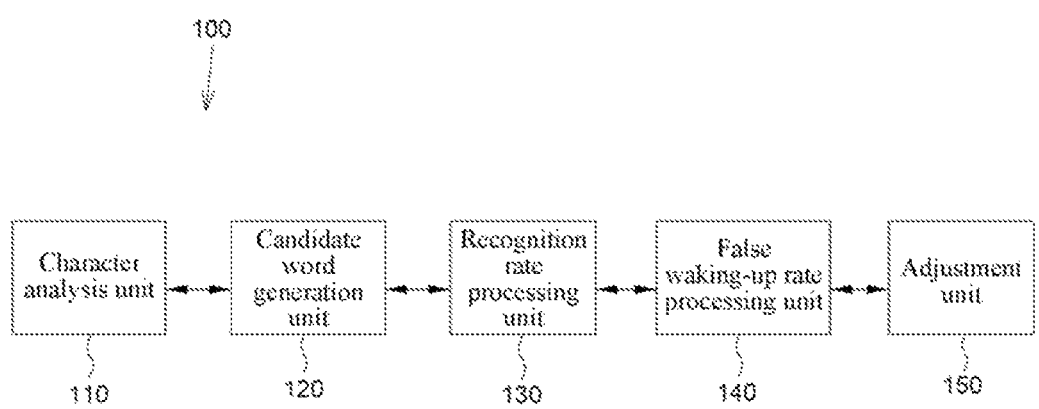
FIG. 1 is a block diagram of an intelligent expanding similar word model system according to the present invention.

FIG. 1 is a block diagram of an intelligent expanding similar word model system according to the present invention. In FIG. 1, an intelligent expanding similar word model system is operated in a database system host 100 and includes: a character analysis unit 110, configured to generate a plurality of key word acoustic models according to a key word character, and to combine the plurality of key word acoustic models with an interference sound key word test set into a key word forward test module; a candidate word generation unit 120, connected to the character analysis unit 110 in telecommunication, and configured to replace, according to the plurality of key word acoustic models, each syllable of the key word character one by one by using a syllable correspondence table to generate a plurality of candidate word temporary acoustic models; a recognition rate processing unit 130, connected to the candidate word generation unit 120 in telecommunication, and configured to execute a speech recognition simulation program, and to obtain a key word recognition rate of a key word forward test module and a candidate word recognition rate of a candidate word forward test module, where when a recognition rate difference between the key word recognition rate and the candidate word recognition rate is greater than a recognition threshold, after a candidate word acoustic model which reduces a recognition rate in the plurality of candidate word acoustic models in the candidate word forward test module is deleted, a first candidate word acoustic model is generated; a false waking-up rate processing unit 140, connected to the recognition rate processing unit 130 in telecommunication, and configured to execute a false waking-up rate simulation program, and to obtain a candidate word false waking-up rate of a first candidate word false waking-up test module and a key word false waking-up rate of a key word false waking-up test module, where when the candidate word false waking-up rate is less than the key word false waking-up rate, a plurality of candidate word acoustic models which reduces a false waking-up rate is selected, and a second candidate word acoustic model is generated; and an adjustment unit 150, connected to the character analysis unit 110, the candidate word generation unit 120, the recognition rate processing unit 130, and the false waking-up rate processing unit 140 in telecommunication, configured to combine the plurality of key word acoustic models with the plurality of candidate word temporary acoustic models into a plurality of candidate word acoustic models, combine the plurality of candidate word acoustic models with the interference sound key word test set into the candidate word forward test module, combine the first candidate word acoustic model with a false waking-up test set into the first candidate word false waking-up test module, combine the plurality of key word acoustic models with the false waking-up test set into the key word false waking-up test module, and combine the plurality of key word acoustic models with the second candidate word acoustic model into a similar word acoustic model, where the interference sound key word test set further includes interference sound key word audio data, the speech recognition simulation program being executed on the interference sound key word test set and the key word acoustic models in the key word forward test module to obtain the key word recognition rate, and the speech recognition simulation program being executed on the interference sound key word test set and the candidate word acoustic models in the candidate word forward test module to obtain the candidate word recognition rate.

It needs be noted that the key word forward test module includes the interference sound key word test set including the interference sound key word audio data and the plurality of key word acoustic models.

The candidate word forward test module includes the interference sound key word test set and the plurality of candidate word acoustic models.

Each candidate word acoustic model includes the plurality of key word acoustic models and the plurality of candidate word temporary acoustic models.

As a preferred manner, the candidate word forward test module may be regarded as the key word forward test module plus the plurality of candidate word temporary acoustic models.

As a preferred manner, the plurality of key word acoustic models and the plurality of candidate word temporary acoustic models are combined into the candidate word acoustic model, so that a recognition target can cover contents of two groups of acoustic models.

In this embodiment, the intelligent expanding similar word model system further includes a key word acoustic model processing unit, where the key word acoustic model processing unit is configured to combine a key word test set corresponding to the plurality of key word acoustic models with an interference sound to generate the interference sound key word test set.

In this embodiment, the intelligent expanding similar word model system further includes a key word extraction unit, where the key word extraction unit is configured to obtain the key word test set.

In this embodiment, the intelligent expanding similar word model system further includes a storage unit, where the storage unit is configured to store the key word acoustic model, the candidate word temporary acoustic model, the candidate word acoustic model, the first candidate word acoustic model, the second candidate word acoustic model, and the similar word acoustic model.

In this embodiment, the character analysis unit generates the key word acoustic model through a monophone modeling mode or a triphone modeling mode.

In this embodiment, the candidate word generation unit replaces each syllable of the key word character one by one by using a syllable correspondence table to generate a plurality of candidate word temporary acoustic models.

In this embodiment, the recognition rate difference in the recognition rate processing unit is a natural number.

In this embodiment, a number of the candidate word acoustic models in the candidate word forward test modules is greater than or equal to a number of the candidate word acoustic models in the number of the first candidate word acoustic models. The number of the candidate word acoustic models in the number of the first candidate word acoustic models is greater than or equal to a number of the candidate word acoustic models in a number of the second candidate word acoustic models. The number of the candidate word acoustic models in the number of the second candidate word acoustic models is greater than or equal to a number of the candidate word acoustic models in the similar word acoustic models.

In this embodiment, the recognition threshold is a system preset value or a user set value.

Figure 2:
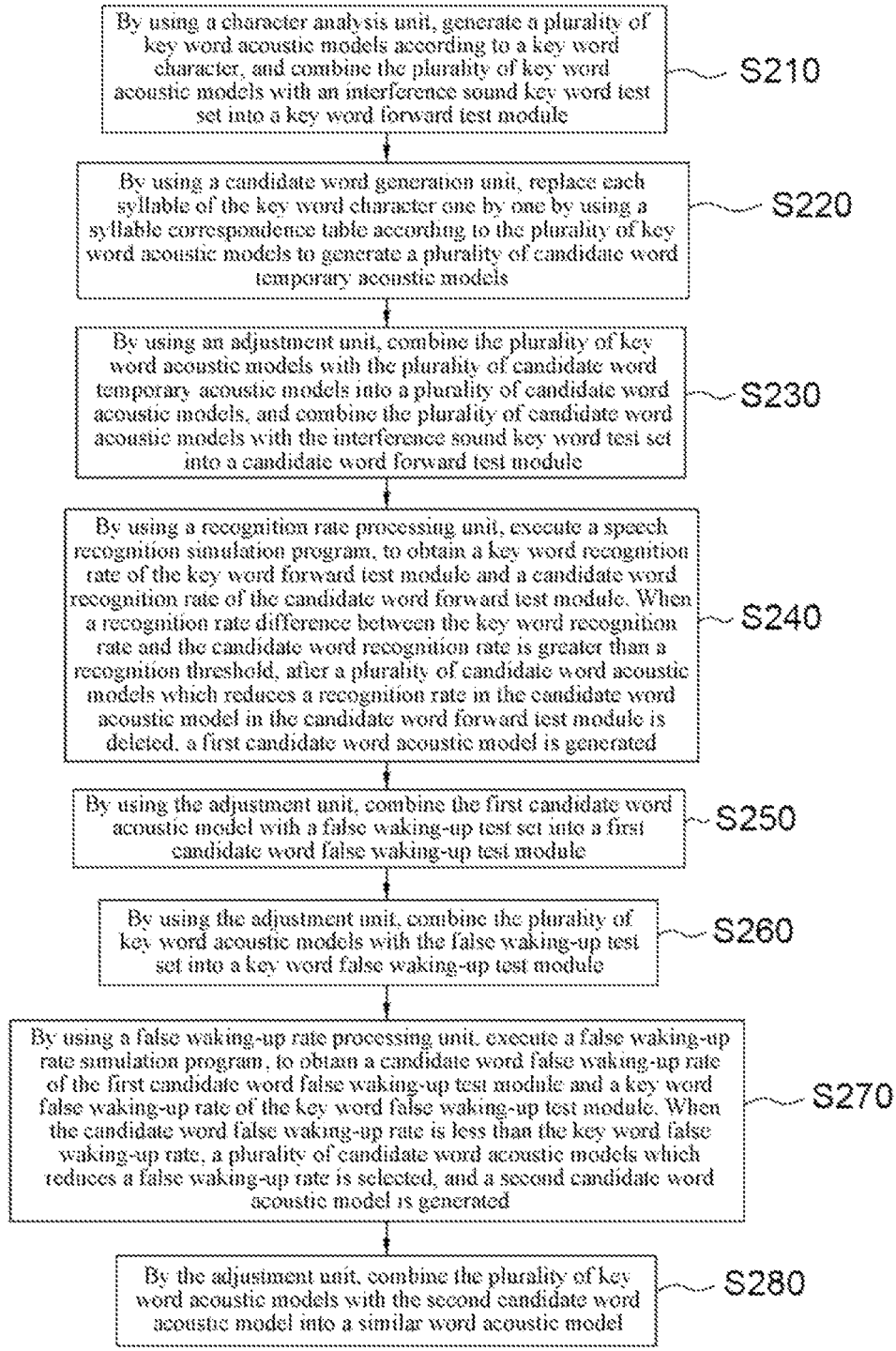
FIG. 2 is a flowchart of steps of an intelligent expanding similar word model method according to the present invention.

FIG. 2 is a flowchart of steps of an intelligent expanding similar word model method according to the present invention. The step process is as follows:

Step S210. By using a character analysis unit, generate a plurality of key word acoustic models according to a key word character, and combine the plurality of key word acoustic models with an interference sound key word test set into a key word forward test module.

As a preferred manner, it can be known by inputting the interference sound key word audio data included in the test module into the key word acoustic model included in the test module to execute the recognition simulation program.

For example, if there are 1000 sentences in the key word audio data, and 900 sentences are successfully recognized after being inputted into the model, the key word recognition rate is 90%.

Step S220. By using a candidate word generation unit, replace each syllable of the key word character one by one by using a syllable correspondence table according to the plurality of key word acoustic models to generate a plurality of candidate word temporary acoustic models.

Step S230. By using an adjustment unit, combine the plurality of key word acoustic models with the plurality of candidate word temporary acoustic models into a plurality of candidate word acoustic models, and combine the plurality of candidate word acoustic models with the interference sound key word test set into a candidate word forward test module.

As a preferred manner, it can be known by inputting the interference sound key word audio data included in the test module into the candidate word acoustic model included in the test module to execute the recognition simulation program.

For example, there are 1000 sentences in the key word audio data, 700 sentences are successfully recognized as key words after being inputted into the model, and 250 sentences are falsely recognized as candidate words. Because the candidate word part is regarded as false recognition, the key word recognition rate is 70% in this case.

Step S240. By using a recognition rate processing unit, execute a speech recognition simulation program, to obtain a key word recognition rate of the key word forward test module and a candidate word recognition rate of the candidate word forward test module. When a recognition rate difference between the key word recognition rate and the candidate word recognition rate is greater than a recognition threshold, after a plurality of candidate word acoustic models which reduces a recognition rate in the candidate word acoustic model in the candidate word forward test module is deleted, a first candidate word acoustic model is generated.

Step S250. By using the adjustment unit, combine the first candidate word acoustic model with a false waking-up test set into a first candidate word false waking-up test module.

Step S260. By using the adjustment unit, combine the plurality of key word acoustic models with the false waking-up test set into a key word false waking-up test module.

Step S270. By using a false waking-up rate processing unit, execute a false waking-up rate simulation program, to obtain a candidate word false waking-up rate of the first candidate word false waking-up test module and a key word false waking-up rate of the key word false waking-up test module. When the candidate word false waking-up rate is less than the key word false waking-up rate, a plurality of candidate word acoustic models which reduces a false waking-up rate is selected, and a second candidate word acoustic model is generated.

Step S280. By the adjustment unit, combine the plurality of key word acoustic models with the second candidate word acoustic model into a similar word acoustic model.

As a preferred manner, the first candidate word false waking-up test module includes the first candidate word acoustic model and the false waking-up test set. It can be known by inputting false waking-up test set audio data into the first candidate word acoustic model included in this test module to execute the recognition simulation program.

For example, if the false waking-up test set audio data lasts for 48 hours in total, and after it is inputted to the model, key word waking-up appears for 2 times, the candidate word false waking-up rate is 1 time/24 hours.

In addition, the foregoing test result may also include candidate word waking-up (for example, the candidate words are woken up for 8 times in 48 hours).

As a preferred manner, the key word false waking-up test module includes the key word acoustic model and the false waking-up test set. It can be known by inputting false waking-up test set audio data into the key word acoustic model included in this test module to execute the recognition simulation program.

For example, if the false waking-up test set audio data lasts for 48 hours in total, and after it is inputted to the model, false waking-up appears for 10 times, the key word false waking-up rate is 5 times/24 hours.

As a preferred manner, the first candidate word acoustic model in the first candidate word false waking-up test module includes the key word acoustic model and the selected candidate word acoustic model, and the key word acoustic model in the key word false waking-up test module does not include another candidate word acoustic model.

In this embodiment, an acoustic model specifically refers to a character part, in which a speech parameter generated through a character is further included.

In this embodiment, a test set specifically refers to a speech signal.

In this embodiment, the acoustic model and the test set are combined into a test module, in which the test module is configured to execute a speech recognition simulation program and a false waking-up rate simulation program.

The key word acoustic model and the key word test set are combined into the key word forward test module.

The key word acoustic model and the false waking-up test set are combined into the key word false waking-up test module.

The key word acoustic model, the candidate word acoustic model, and the key word test set are combined into the candidate word forward test module.

The key word acoustic model, the candidate word acoustic model, and the false waking-up test set are combined into the candidate word false waking-up test module.

In this embodiment, a large amount of the key word acoustic models similar to the key word character are generated by using the character analysis unit.

In this embodiment, the character analysis unit generates the key word acoustic model through a monophone modeling mode or a triphone modeling mode.

In the monophone modeling mode, a monophone is used for establishing the key word acoustic model.

In the triphone modeling mode, left and right related phones are used for establishing the key word acoustic model, and the mode further includes: configuring a multilingual hybrid dictionary according to a monolingual dictionary respectively corresponding to each different language.

In this embodiment, the candidate word generation unit replaces each syllable of the key word character one by one by using a syllable correspondence table.

The intelligent expanding similar word model system further includes a key word syllable replacement correspondence table.

In this embodiment, by using the recognition rate processing unit, a test sentence of the key word acoustic model is used for deleting a candidate word acoustic model having an adverse influence which "affects the recognition rate" from the candidate word forward test module, and the left is a first candidate word acoustic model of "a similar word which does not affect the recognition rate".

In this embodiment, by using the false waking-up rate processing unit, the test audio file of the false waking-up rate is used for selecting a candidate word acoustic model which can best reduce the false waking-up rate from the candidate word acoustic models of "a similar word that does not affect the recognition rate". When the candidate word false waking-up rate is less than the key word false waking-up rate, the plurality of candidate word acoustic models which reduces the false waking-up rate are selected to generate a second candidate word acoustic model.

As a preferred manner, a difference between the candidate word false waking-up rate and the key word false waking-up rate is in the acoustic model. For example, the first candidate word acoustic model in the first candidate word false waking-up test module includes the key word acoustic model and the selected candidate word acoustic model, and the key word acoustic model in the key word false waking-up test module does not include another candidate word acoustic model.

Figure 3:
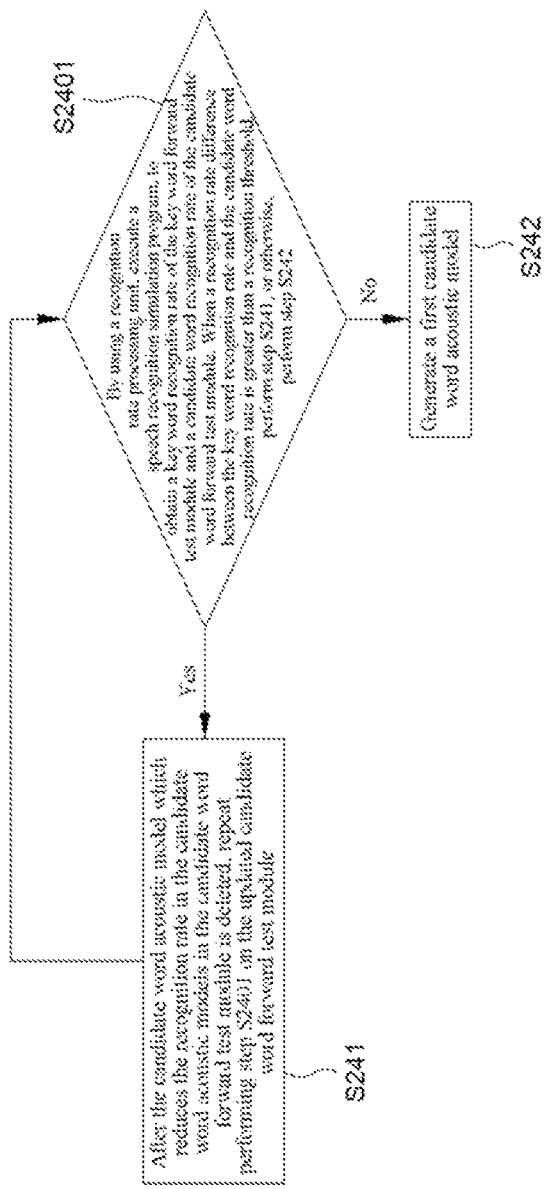
FIG. 3 is a flowchart of an embodiment of an intelligent expanding similar word model method according to the present invention.

FIG. 3 is a flowchart of an embodiment of an intelligent expanding similar word model method according to the present invention. In FIG. 3, the intelligent expanding similar word model method further includes performing step S2401: By using a recognition rate processing unit, execute a speech recognition simulation program, to obtain a key word recognition rate of the key word forward test module and a candidate word recognition rate of the candidate word forward test module. When a recognition rate difference between the key word recognition rate and the candidate word recognition rate is greater than a recognition threshold, perform step S241, or otherwise, perform step S242.

Step S241. After the candidate word acoustic model which reduces the recognition rate in the candidate word acoustic models in the candidate word forward test module is deleted, repeat performing step S2401 on the updated candidate word forward test module.

Step S242. Generate a first candidate word acoustic model.

In this embodiment, for example, the key word recognition rate obtained through the key word forward test module, including the interference sound key word audio data and the key word acoustic model, is 90%.

Then, for example, the candidate word recognition rate obtained through the candidate word forward test module, including the interference sound key word audio data and the candidate word acoustic model, is 70%.

The candidate word acoustic model includes the key word acoustic model and the candidate word temporary acoustic model.

For example, the recognition threshold is 20%.

If a difference between a previous key word recognition rate and candidate word recognition rate is less than or equal to 20%, the candidate word acoustic model is the first candidate word acoustic model in this case.

If the difference between the previous key word recognition rate and candidate word recognition rate is greater than 20%, it indicates that some candidate word temporary acoustic models interfere with the recognition result. The candidate word temporary acoustic models that affect the recognition result need to be removed from the candidate word acoustic model in the candidate word forward test module, to form a new candidate word forward test module.

Figure 4:
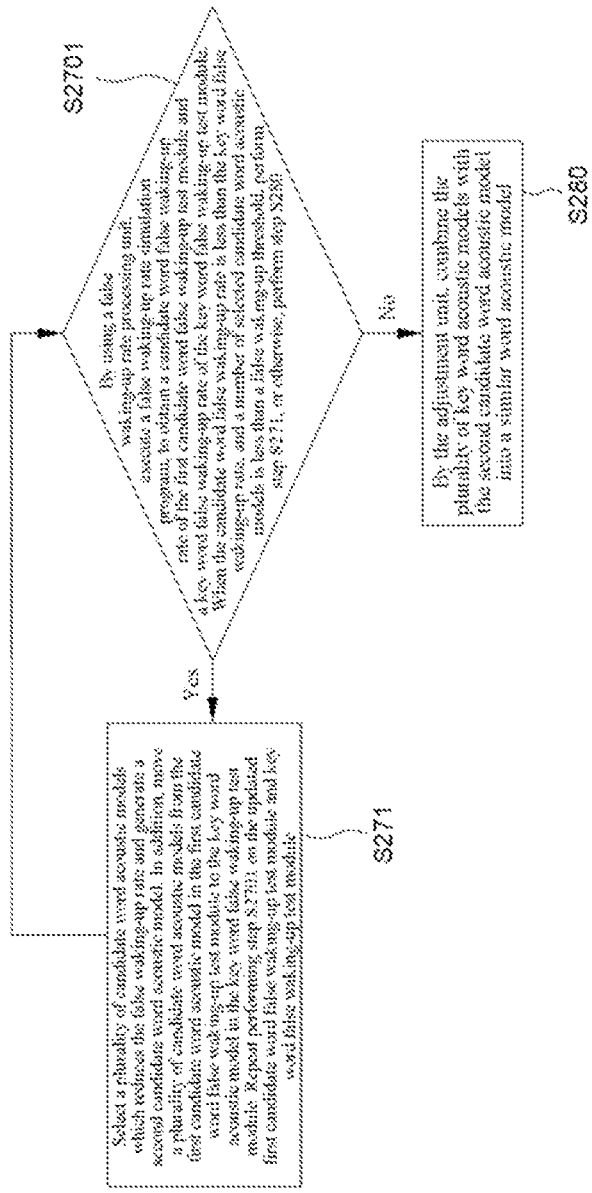
FIG. 4 is a flowchart of another embodiment of an intelligent expanding similar word model method according to the present invention.

FIG. 4 is a flowchart of another embodiment of an intelligent expanding similar word model method according to the present invention. In FIG. 4, the intelligent expanding similar word model method further includes performing step S2701: By using a false waking-up rate processing unit, execute a false waking-up rate simulation program, to obtain a candidate word false waking-up rate of the first candidate word false waking-up test module and a key word false waking-up rate of the key word false waking-up test module.

When the candidate word false waking-up rate is less than the key word false waking-up rate, and a number of selected candidate word acoustic models is less than a false waking-up threshold, perform step S271, or otherwise, perform step S280.

Step S271. Select a plurality of candidate word acoustic models which reduces the false waking-up rate and generate a second candidate word acoustic model. In addition, move a plurality of candidate word acoustic models from the first candidate word acoustic model in the first candidate word false waking-up test module to the key word acoustic model in the key word false waking-up test module. Repeat performing step S2701 on the updated first candidate word false waking-up test module and key word false waking-up test module.

In this embodiment, if the false waking-up test set audio data lasts for 48 hours in total, and after it is inputted into the model, key word waking-up appears for 2 times, the candidate word false waking-up rate is 1 time/24 hours.

In addition, the foregoing test result may also include candidate word waking-up (for example, the candidate words are woken up for 8 times in 48 hours).

As a preferred manner, in this case, the candidate words woken up for 8 times may be regarded as "a plurality of candidate word acoustic models the false waking-up rate". The 8 candidate word acoustic models are marked as the second candidate word acoustic model, and it is moved from the first candidate word acoustic model and combined into the key word acoustic model.

If the false waking-up rate is still greater than the threshold in this case, using the merged acoustic model and the remaining candidate word model as the recognition target, and using the same false waking-up test set as the input, the simulation recognition program is used for calculating the candidate word false waking-up rate and the key word false waking-up rate again.

Similarly, "a plurality of candidate word acoustic models which reduces the false waking-up rate" is selected to add to the second candidate word acoustic model, and this process is repeated until the false waking-up rate is less than the threshold.

A number of acoustic models in the second candidate word acoustic model gradually increases.

A calculation mode of the false waking-up threshold of the false waking-up rate is by using a number of false triggering in a unit time. For example, when the false waking-up threshold is 30, if the first candidate word false waking-up test module is falsely triggered for more than 30 times within 24 hours, the plurality of candidate word acoustic models which reduces the false waking-up rate are selected.

The false waking-up threshold is a system preset value or a user set value.

Figure 5:
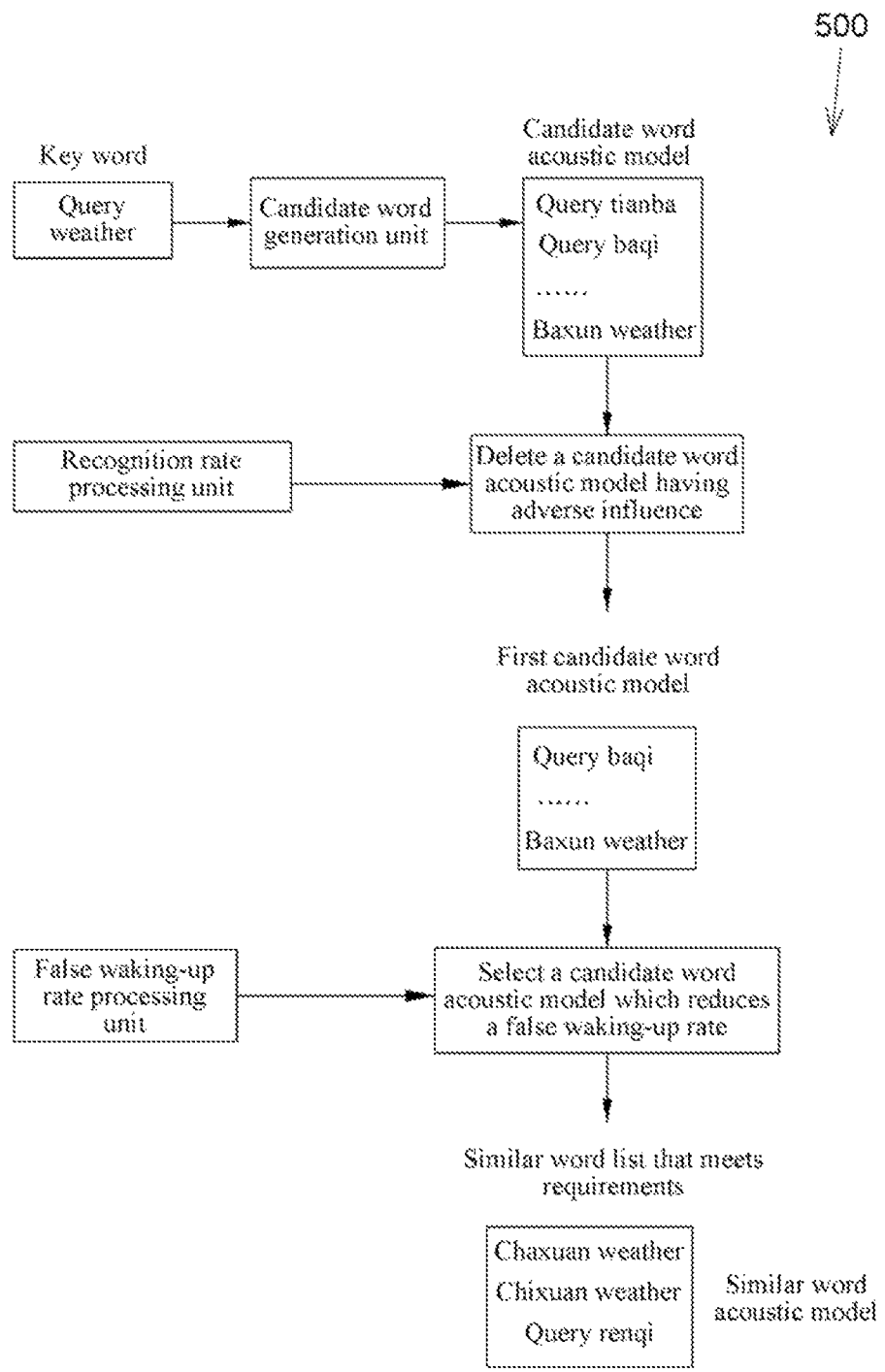
FIG. 5 is a schematic diagram of an embodiment of an intelligent expanding similar word model method according to the present invention.

FIG. 5 is a schematic diagram 500 of an embodiment of an intelligent expanding similar word model method according to the present invention. In FIG. 5, using a key word "query weather" as an example, the character analysis unit is configured to perform character analysis according to the key word character, to generate the key word forward test module, and then the candidate word generation unit is configured to generate 2000 candidate word speech signals including "query tianba", . . . , "query baqi", . . . , "baxun weather", and the like according to the key word forward test module, and to generate the candidate word acoustic model.

By using a recognition rate processing unit, a speech recognition simulation program is executed, to obtain a key word recognition rate of the key word forward test module and a candidate word recognition rate of the candidate word forward test module. When a recognition rate difference between the key word recognition rate and the candidate word recognition rate is greater than a recognition threshold, after a plurality of candidate word acoustic models which reduces a recognition rate in the candidate word acoustic model in the candidate word forward test module is deleted, a first candidate word acoustic model is generated.

In this embodiment, by using the recognition rate processing unit, a test sentence of the key word acoustic model is used for deleting a candidate word acoustic model having an adverse influence which "affects the recognition rate" from the candidate word forward test module, and the left is a first candidate word acoustic model of "a similar word which does not affect the recognition rate".

In this embodiment, using that the recognition threshold is equal to 0 as an example, "query weather" is used for recognition first, and assuming that there are 100 sentences of test data, of which 95 sentences are recognized, the key word recognition rate is 95%.

"Query weather" and 2000 candidate words are recognized together. In 100 sentences, 70 sentences are weather query, 10 sentences are candidate words A, 10 sentences are candidate words B, 5 sentences are candidate words C, and then the candidate word recognition rate is 70%. When a recognition rate difference between the candidate word recognition rate and the key word recognition rate is greater than 0, the candidate words A, candidate words B, and candidate words C which have been falsely recognized for many times are deleted, and there are 1997 candidate words left in the candidate word acoustic model.

The foregoing steps are repeated. When the recognition rate difference is less than or equal to the recognition threshold, remaining candidate word speech signals, such as the candidate word speech signals including "query tianba", . . . , "baxun weather", and the like are generated as a first candidate word model.

The recognition rate difference is a system preset value or a user set value.

By using a false waking-up rate processing unit, a false waking-up rate simulation program is executed, to obtain a candidate word false waking-up rate of the first candidate word false waking-up test module and a key word false waking-up rate of the key word false waking-up test module. When the candidate word false waking-up rate is less than the key word false waking-up rate, a plurality of candidate word acoustic models which reduces the false waking-up rate is selected.

The test audio file of the false waking-up rate is used for selecting a candidate word acoustic model which can best reduce the false waking-up rate from the candidate word acoustic models of "a similar word that does not affect the recognition rate". When the candidate word false waking-up rate is less than the key word false waking-up rate, the plurality of candidate word acoustic models which reduces the false waking-up rate are selected to generate a second candidate word acoustic model.

A calculation mode of the false waking-up threshold of the false waking-up rate is by using a number of false triggering in a unit time. For example, when the false waking-up threshold is 30, if the first candidate word false waking-up test module is falsely triggered for more than 30 times within 24 hours, the plurality of candidate word acoustic models which reduces the false waking-up rate are selected.

The false waking-up threshold is a system preset value or a user set value.

In this embodiment, the remaining candidate word speech signals including "chaxuan weather", . . . , "chixuan weather", . . . , "query renqi", and the like are established as a second candidate word acoustic model.

Finally, the plurality of key word acoustic models and the second candidate word acoustic model are combined into a similar word acoustic model.

In summary, the speech recognition program in the present invention may be roughly divided into two inputs and an output. The two inputs include an acoustic model and a test set. A combination of such acoustic model and test set is referred to as a module in this specification. The output includes a recognition result, and the "test set" is compared with the "acoustic model" to obtain the "recognition result". According to the present invention, a large amount of similar word candidate words are automatically generated, a similar word affecting the recognition rate in the similar word candidate list is automatically deleted using key word test sentences, and a most effective similar word is gradually selected from the similar word candidate list through a test audio file of a false touch rate to establish a key word model required for speech recognition, thereby effectively improving a situation where the similar words must be manually created in tradition, which is relatively difficult for a non-native language developer, and resolving a problem that whether to choose the similar word or not needs to be manually decided, which is quite time-consuming.

Although the present invention is disclosed above with the foregoing embodiments, the embodiments are not intended to limit the present invention. Any changes or improvements made by the skilled in the art without departing from the spirit and scope of the present invention, shall fall within the protection scope of the present invention.

What is claimed is:

1. An intelligent expanding similar word model system, operated in a database system host, the system comprising:
   a character analysis unit, configured to generate a plurality of key word acoustic models according to a key word character, and to combine the plurality of key word acoustic models with an interference sound key word test set into a key word forward test module;
   a candidate word generation unit, connected to the character analysis unit in telecommunication, and configured to replace each syllable of the key word character one by one by using a syllable correspondence table according to the plurality of key word acoustic models to generate a plurality of candidate word temporary acoustic models;
   a recognition rate processing unit, connected to the candidate word generation unit in telecommunication, and configured to execute a speech recognition simulation program, and to obtain a key word recognition rate of a key word forward test module and a candidate word recognition rate of a candidate word forward test module, wherein when a recognition rate difference between the key word recognition rate and the candidate word recognition rate is greater than a recognition threshold, after a plurality of candidate word acoustic models which reduces a recognition rate in a candidate word acoustic model of the plurality of candidate word acoustic models in the candidate word forward test module is deleted, a first candidate word acoustic model is generated;
   a false waking-up rate processing unit, connected to the recognition rate processing unit in telecommunication, and configured to execute a false waking-up rate simulation program, and to obtain a candidate word false waking-up rate of a first candidate word false waking-up test module and a key word false waking-up rate of a key word false waking-up test module, wherein when the candidate word false waking-up rate is less than the key word false waking-up rate, the plurality of candidate word acoustic models which reduces a false waking-up rate is selected, and a second candidate word acoustic model is generated; and an adjustment unit, connected to the character analysis unit, the candidate word generation unit, the recognition rate processing unit, and the false waking-up rate processing unit in telecommunication, and configured to combine the plurality of key word acoustic models with the plurality of candidate word temporary acoustic models into the plurality of candidate word acoustic models, combine the plurality of candidate word acoustic models with the interference sound key word test set into the candidate word forward test module, combine the first candidate word acoustic model with a false waking-up test set into the first candidate word false waking-up test module, combine the plurality of key word acoustic models with the false waking-up test set into the key word false waking-up test module, and combine the plurality of key word acoustic models with the second candidate word acoustic model into a similar word acoustic model, wherein the interference sound key word test set further comprises interference sound key word audio data, the speech recognition simulation program being executed on the interference sound key word test set and the key word acoustic models in the key word forward test module to obtain the key word recognition rate, and the speech recognition simulation program being executed on the interference sound key word test set and the candidate word acoustic models in the candidate word forward test module to obtain the candidate word recognition rate.

2. The intelligent expanding similar word model system according to claim 1, further comprising a key word acoustic model processing unit, wherein the key word acoustic model processing unit is configured to combine a key word test set corresponding to the plurality of key word acoustic models with an interference sound to generate the interference sound key word test set.

3. The intelligent expanding similar word model system according to claim 2, further comprising a key word extraction unit, wherein the key word extraction unit is configured to obtain the key word test set.

4. The intelligent expanding similar word model system according to claim 1, further comprising a storage unit, wherein the storage unit is configured to store the key word acoustic model, the candidate word temporary acoustic model, the candidate word acoustic model, the first candidate word acoustic model, the second candidate word acoustic model, and the similar word acoustic model.

5. The intelligent expanding similar word model system according to claim 1, wherein the character analysis unit generates the key word acoustic model through a monophone modeling mode or a triphone modeling mode.

6. The intelligent expanding similar word model system according to claim 1, wherein the candidate word generation unit replaces each syllable of the key word character one by one by using a syllable correspondence table to generate a plurality of candidate word temporary acoustic models.

7. The intelligent expanding similar word model system according to claim 1, wherein the recognition rate difference in the recognition rate processing unit is a natural number.

8. The intelligent expanding similar word model system according to claim 1, wherein a number of the candidate word acoustic models in the candidate word forward test module is greater than or equal to a number of the candidate word acoustic models in a number of the first candidate word acoustic models; the number of the candidate word acoustic models in the number of the first candidate word acoustic models is greater than or equal to a number of the candidate word acoustic models in a number of the second candidate word acoustic models; and the number of the candidate word acoustic models in the number of the second candidate word acoustic models is greater than or equal to a number of the candidate word acoustic models in the similar word acoustic models.

9. The intelligent expanding similar word model system according to claim 1, wherein the recognition threshold is a system preset value or a user set value.

10. An intelligent expanding similar word model method, comprising:

generating, by using a character analysis unit, a plurality of key word acoustic models according to a key word character, and combining the plurality of key word acoustic models with an interference sound key word test set into a key word forward test module;

replacing, by using a candidate word generation unit, each syllable of the key word character one by one by using a syllable correspondence table according to the plurality of key word acoustic models to generate a plurality of candidate word temporary acoustic models;

combining, by using an adjustment unit, the plurality of key word acoustic models with the plurality of candidate word temporary acoustic models into a plurality of candidate word acoustic models, and combining the plurality of candidate word acoustic models with the interference sound key word test set into a candidate word forward test module;

executing, by using a recognition rate processing unit, a speech recognition simulation program, to obtain a key word recognition rate of the key word forward test module and a candidate word recognition rate of the candidate word forward test module, wherein when a recognition rate difference between the key word recognition rate and the candidate word recognition rate is greater than a recognition threshold, after a plurality of candidate word acoustic models which reduces a recognition rate in a candidate word acoustic model of the plurality of candidate word acoustic models in the candidate word forward test module is deleted, a first candidate word acoustic model is generated;

combining, by using the adjustment unit, the first candidate word acoustic model with a false waking-up test set into a first candidate word false waking-up test module;

combining, by using the adjustment unit, the plurality of key word acoustic models with the false waking-up test set into a key word false waking-up test module;

executing, by using a false waking-up rate processing unit, a false waking-up rate simulation program, to obtain a candidate word false waking-up rate of the first candidate word false waking-up test module and a key word false waking-up rate of the key word false waking-up test module, wherein when the candidate word false waking-up rate is less than the key word false waking-up rate, the plurality of candidate word acoustic models which reduces a false waking-up rate is selected, and a second candidate word acoustic model is generated; and combining, by the adjustment unit, the plurality of key word acoustic models with the second candidate word acoustic model into a similar word acoustic model, wherein the interference sound key word test set further comprises interference sound key word audio data, the speech recognition simulation program being executed on the interference sound key word test set and the key word acoustic models in the key word forward test module to obtain the key word recognition rate, and the speech recognition simulation program being executed on the interference sound key word test set and the candidate word acoustic models in the candidate word forward test module to obtain the candidate word recognition rate.

* * * * *